Figure 5:
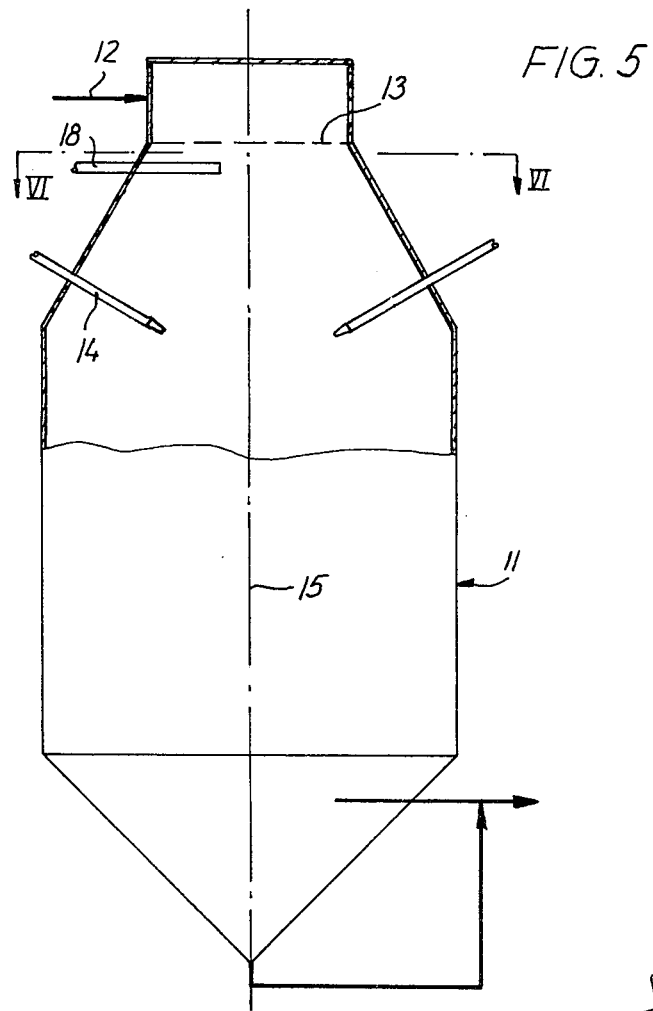

United States Patent [19]

Felsvang et al.

[11] 4,229,249
[45] Oct. 21, 1980

[54] PRODUCTION OF A POWDER OF POLYVINYLCHLORIDE OR A VINYLCHLORIDE COPOLYMERIZATE SUITABLE FOR PRODUCING PLASTISOLS

[75] Inventors: Karsten S. Felsvang, Allerød; Ove E. Hansen, Vaerløse, both of Denmark

[73] Assignee: A/S Niro Atomizer, Denmark

[21] Appl. No.: 22,885

[22] Filed: Mar. 22, 1979

Related U.S. Application Data

[63] Continuation of Ser. No. 792,609, May 2, 1977, abandoned.

[30] Foreign Application Priority Data

May 12, 1976 [DK] Denmark ............................ 2108/76

[51] Int. Cl.² .............................................. B01D 1/18
[52] U.S. Cl. ..................................... 159/4 B; 528/501; 159/4 J; 159/48 R; 159/DIG. 10
[58] Field of Search ............. 159/DIG. 10, 48 R, 4 B, 159/4 J, 45, 45 R, 4 R; 526/344, 3; 528/501, 502

[56] References Cited

U.S. PATENT DOCUMENTS

| 2,636,555 | 4/1953 | Klepetko et al. ............... 159/48 R |
| 2,842,193 | 7/1958 | Ballestra ....................... 159/48 R |
| 3,499,476 | 3/1970 | Hartlapp et al. ............... 159/48 R |
| 3,748,103 | 7/1973 | Bean et al. .................... 159/48 R |
| 3,883,494 | 5/1975 | Winter et al. .................. 526/344.3 |
| 3,993,536 | 11/1976 | Kalka et al. .................. 159/DIG. 10 |

FOREIGN PATENT DOCUMENTS

| 2146753 | 3/1973 | Fed. Rep. of Germany ............. 159/4 |
| 584330 | 1/1947 | United Kingdom . |
| 748647 | 5/1956 | United Kingdom . |
| 1176996 | 1/1970 | United Kingdom . |
| 1193559 | 6/1970 | United Kingdom . |
| 1304793 | 1/1973 | United Kingdom . |
| 1350098 | 4/1974 | United Kingdom . |

Primary Examiner—Norman Yudkoff
Attorney, Agent, or Firm—Bacon & Thomas

[57] ABSTRACT

An aqueous dispersion of polyvinylchloride or vinylchloride copolymerizate is spray dried in a flow of drying air in a drying tower which contains at least one two-fluid nozzle for atomizing the aqueous dispersion and an injection member for pressurized air for providing the atomized particles with a rotary motion, about the longitudinal axis of the drying tower. A controlled rotary motion is imparted to the mixture of sprayed particles and the drying air. The heat economy and product quality are improved since it is possible to use a high drying air inlet temperature and to obtain an easily grindable powder suitable for producing stable, low viscosity plastisols.

9 Claims, 7 Drawing Figures

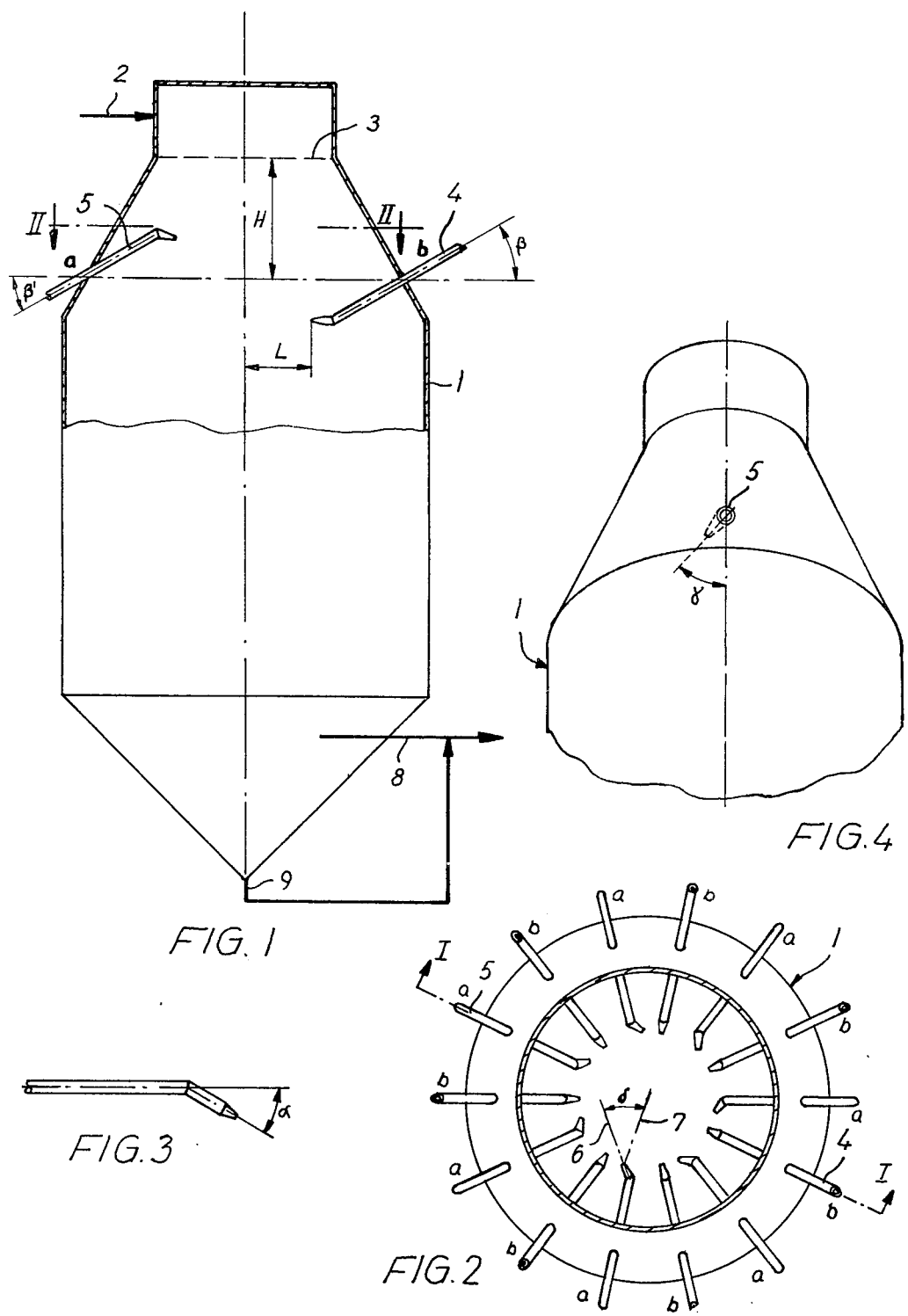

PRESSURISED AIR

PRODUCTION OF A POWDER OF POLYVINYLCHLORIDE OR A VINYLCHLORIDE COPOLYMERIZATE SUITABLE FOR PRODUCING PLASTISOLS

This is a continuation of application Ser. No. 792,609, filed May 2, 1977 now abandoned.

Polyvinylchloride or vinylchloride copolymerisates are frequently used in the form of plastisols, i.e. dispersions of finely divided polymers in plasticizers. These plastisols are used in various casting and coating processes, in which advantage is taken of the fact that heating of the plastisol results in a unification of the plasticizer and the polymer to form a homogeneous solid plasticizer-containing plastic.

Such use of plastisols makes heavy demands on their properties, including stability.

Thus, it is required that at a polymer content of about 50 to 70 percent by weight, for example, the plastisol
 (1) must be capable of maintaining the polymer particles uniformly dispersed in the plasticizer,
 (2) must have a viscosity which is appropriately low and which, to a great extent, is independent of the shearing forces to which the plastisols are exposed, and
 (3) must be capable of maintaining said viscosity properties for several days.

It is possible to lower the viscosity of a too-heavy plastisol by adding a solvent but this is undesirable since this requires expenditure on solvents and gives disadvantages in connection with the application of plastisols.

In order to fulfill the above demands the polymer powder to be used in the production of the plastisol must possess quite particular qualities as will be explained in more detail below.

The polymer powder is produced by spray drying an aqueous emulsion, a so-called latex, of polyvinylchloride or a vinylchloride copolymerisate, for example a vinylchloride vinylidenchloride copolymerisate, which emulsion normally contains smaller quantities of emulsifiers or other auxiliary agents.

Usually, spray-drying is performed with the aid of two-fluid nozzles. Normally, this procedure results in a powder of such large particle size as to necessitate grinding of at least the coarsest fraction thereof prior to its use in the production of plastisols. It is true that the published German application No. 2 146 753 discloses a process where such grinding is not required because particularly large quantities of air are used in the spray-drying process but the procedure requires so much energy that the additional expenses therefor more than outweigh the economy obtainable by abandoning the grinding process. Consequently, the process with which the present invention is concerned is of the type where use is made of quantities of air smaller than those used in the German application, and where at least part of the powder resulting from the spray-drying process is ground.

The latex used as initial material will normally be a latex derived directly from the production of the polyvinylchloride or vinylchloride copolymerisate by emulsion polymerization, and it contains the polymer as particles having an average particle size of up to approximately 0.1 to $0.2\mu$. However, other types of latex come into consideration, too.

The particles suspended in the latex are normally called primary particles. When the latex is spray-dried the resulting product comprises far larger particles which are called secondary particles, and each secondary particle contains numerous primary particles.

In order that the product resulting from the spray-drying process can possess such qualities as to permit grinding thereof without using a particularly demanding grinding procedure and to permit the use for the production of plastisols complying with the above-specified demands, it is required that the primary particles be suitably packed in the secondary particles and be suitably sintered, and it is also required that the secondary particles be substantially free of vacuoles.

Publication has been made of a number of test results and theories regarding the factors in the spray-drying process that are of significance for attaining optimum qualities in the secondary particles. See for example B. P. Shartkman et al., Kolloidnyi Zhurnal, Vol. 31, No. 4, p. 611–616 (1969), Valentian Bojeshan et al, Revue Roumaine de Chimie, 19, 2, p. 283–292 (1974), 19, 3, p. 493–500 (1974), and H. Wiesebach et al, Plaste und Kautschuk, Vol. 21, Part 8, p. 576–578 (1974).

In the first-mentioned article it is emphasised that the distribution or packing of the primary particles within the secondary particles is determined during the initial stages of the drying-process while so much water is still present in the individual drops as to permit regrouping of the primary particles. The compactness of the secondary particles, which inter-alia is a result of said re-grouping of the primary particles, depends in addition to the average size and particle size distribution of the primary particles, also on the length of time available for such re-grouping, and this period of time is again dependent on the concentration of the latex during the spray-drying and especially on the temperature of the drying air surrounding the droplets during the initial stage of the drying process.

In the first-mentioned article the drying process is performed in a "NIRO ATOMIZER" spray-drier, wherein momentary contact is established between the atomized droplets and the hot drying gas. In the other three articles atomization is effected by means of a two-fluid nozzle. In the last-mentioned process the atomization is effected in the upper portion of a tank or tower, hereinafter called a drying tower. Atomization in conformity with conventional practice is effected in the vertical direction, or in a downward-sloping direction towards the centre line of the tower. Hot drying air is directed through the tower from top to bottom.

From all of the above four references it appears that the most important factor in latex drying from the point of view of applicability of the resulting powder to the production of plastisols, is the drying temperature. It is, however, stated that the effect of temperature changes in the drying processes used in said four references is rather complicated.

Thus, a low drying temperature will cause the initial stage of the drying process to proceed so slowly that there will be ample time for the primary particles to re-group so that the secondary particles will have a densely packed infrastructure. However, slight heating will cause the primary particles to sinter insufficiently with the result that the secondary particles will rapidly break down into individual primary particles when coming into contact with the plasticizer in the plastisol. This will give too high a viscosity.

Also, the above stated references indicate that overheating of the particles will result in such defects in the powder produced as to make it inapplicable for the production of plastisols. If heated too much the particles will become vitreous on account of excessive surface melting, and this has the effect that the particles cannot maintain a uniform distribution in the plasticizer. At the same time a high drying air inlet temperature results in the production of vacuoles within the particles during the drying process. When such particles are mixed with the plasticizer the latter will penetrate into the vacuoles where it does not contribute to reducing the viscosity of the mixture so that the plastisol obtained will be too viscous.

When the spray-dried product is subjected to a grinding process, such as is the case with the process according to the invention, conditions are further complicated. This is partly because the particles obtained when using a relatively high drying temperature have a mechanical strength of such order that the grinding thereof involves technical problems and requires high energy consumption. Also, the application of a grinding process makes it more difficult to determine the optimum conditions for the heat effect on the primary particles, contained within the secondary particles. Of course, the sintering of the primary particles will be more advanced at the surfaces of the secondary particles than in their interior, but when ground particles are used for the production of plastisols all parts of the particles will come into contact with the plasticizer. For this reason insufficient sintering of the interior parts will cause the particles to break down with an undesirable increase in viscosity as a result. The packing of the primary particles will also be of great importance when a grinding procedure is applied.

However, it is possible that a certain restricted breakdown in the plasticizer of the interior parts of the secondary particles exposed by the grinding process will contribute to lower viscosity. The break-down of these particles into primary particles or into minor groups comprising relatively few primary particles, may reduce viscosity by providing a suitable grain size distribution in the plastisol. The grains in the plastisol will, in such a case, consist of relatively coarse grains originating from the surface areas of the secondary particles and of finer grains originating from the interior of said particles. Such grain size distribution, where a substantial number of grains are in one or other of two rather narrow and mutually very different grain size ranges, provides a lower viscosity and improved flow properties in comparison with a powder with a very uniform grain size distribution as well as a powder in which many different grain sizes are equally represented.

From the above it will appear that the temperature of the drying air, viz. both the temperature of the drying air injected at the top of the tower and the temperature of the air discharged at the bottom of said tower, is of quite decisive importance for the applicability of the resulting product, and when applying known technology it is difficult to obtain a product free of such shortcomings as are due to a drying air temperature which is either too low or too high.

In the experiments referred to in the above articles by Valentina Bojeshan, the inlet temperature of the drying air injected at the top of the drying tower was between 100° and 140° C. whereas the outlet temperature of the drying air at the bottom of the tower was between 60° and 100° C. Thus, the conclusion must be that in experiments resulting in applicable products, inlet temperatures of the drying gas substantially below 140° C. have been used.

Out of regard for heat economy it is, however, desirable to use higher drying air inlet temperatures. That this improves the heat economy of drying process appears from the fact that the percentual, overall thermal efficiency can be expressed as follows:

$$n = [(T_1 - T_2)/T_1 - T_0)] \times 100$$

where $T_1$ is the drying air inlet temperature, $T_2$ is the drying air outlet temperature, if the process were completely adiabatic, and $T_0$ is the ambient temperature.

Since $T_2$ is higher than $T_0$ it will appear from this generally known formula of calculation that the thermal efficiency is improved when $T_1$ is increased while maintaining $T_2$ and $T_0$ substantially constant.

It has proved possible in connection with industrial drying processes of the aforesaid type in some drying installations to use a drying air inlet temperature of up to 180° C., but this represents the maximum temperature heretofore applicable. Further increases would interalia result in the product being difficult to grind.

Thus, there is a need of an improved process for carrying out drying with a view to achieving a product which, in conjunction with a grinding process, can be used for producing plastisols of particularly low and stable viscosity, and which provides improved heat economy as a consequence of the fact that it permits use of a substantially higher drying air inlet temperature than heretofore permissible in connection with nozzle towers.

We have found that when carrying out the drying process in a drying tower wherein a controlled rotary motion about the longitudinal axis of the tower is maintained, it is possible to obtain a product which, as far as its capability of being suitably ground and of providing a plastisol of relatively low viscosity is concerned, is superior to the product obtainable if the drying process had been carried out in conformity with known techology without said controlled rotary motion about the longitudinal axis of the drying tower.

The controlled rotary motion can be provided by injecting a certain amount of air into the drying tower with a suitable tangential component.

At the same time it also transpires, surprisingly, that it is possible to apply a substantially increased drying air inlet temperature in conjunction with said controlled rotary motion without causing any of the above-described defects in the resulting product, which whold have occurred if the flow within the drying tower would have had no tangential component. As explained above this results in improved heat economy. Additionally, an improved flexibility is attained as will be explained below.

Thus, this invention relates to a process for the production of a powder of polyvinylchloride or a vinylchloride copolymerisate suitable for the production of plastisols, the process consisting in spraying, via at least one two-fluid nozzle, an aqueous dispersion of polyvinylchloride or a vinylchloride copolymerisate, if desired containing emulsifiers and other auxiliary agents, into a substantially uniform flow of drying air within a drying tower, so that said drying process is substantially carried out as a co-current process, and grinding at least the coarsest fraction of the resulting powder, said process being according to the invention characterised in providing within said drying tower a controlled rotary motion of the particles produced by atomization and the drying air about the longitudinal axis of said drying tower by injecting, via at least one injector member, pressurised air in a direction which, projected onto a plane at right angles to the longitudinal axis of the drying tower, forms an angle with a line (also projected onto said plane) through the centre of the drying tower and the injector outlet orifice.

For the purpose of attaining improved heat economy, a preferred embodiment of the process is, according to the invention, characterised in that the temperature of the drying air, when introduced into the tower, is above 140° C. Preferably, the drying air is introduced at a temperature of between 180° and 280° C., i.e. temperatures substantially higher than those used heretofore for such purposes.

It has not so far been fully determined why the application of the feature characteristic of the process according to the invention provides the particularly desirable qualities in the product resulting from the drying process, and permits the use of a substantially increased drying air inlet temperature. It is assumed that these results may be due in part to a longer duration of the initial stage of the drying process whereby there is attained, inter alia, a better packing of the primary particles within the secondary particles. Furthermore, the advantage may be due in part to the change that occurs as a consequence of the heat effects to which the individual particles are exposed, as compared with a drying process without controlled rotary motion. In this connection it should be noted that when watching flow conditions within the part of the drying tower facing the drying air inlet it has been observed that some of the particles already partially dry are whisled into the hot drying air from somewhat cooler areas. This does not, however, apply to all particles, and the dissimilar heat influences, to which the particles therefore are exposed, are assumed to contribute to the fact that the resulting plastisol has a lower viscosity.

As an injector member for providing and controlling the rotary motion use can be made of one or more pipes, if desired provided with nozzles, arranged for injecting air in the required direction. In larger installations it is not required to use a special injector member since in accordance with a feature of the invention this member may consist of one or more two-fluid nozzles so arranged as to operate in the direction stated. This affords a very simple design.

It should be noted that it is known per se to provide a rotary motion within a drying installation by so directing the spray nozzles as to inject air in a direction which, projected onto a plane at right angles to the longitudinal axis of the drying installation, forms an angle with a line (also projected onto said plane) through the centre of the installation and the orifice of the nozzle(s). Such a principle has, for example, been used in U.S. Pat. No. 3,618,655. According to this Specification the total quantity of drying air is injected via such nozzles, and the process dealt with in the Specification will be unsuitable for drying polyvinylchloride latex, inter alia because the rotation and turbulence will be too vigorous.

Moreover U.S. Pat. No. 3,966,418, dated June 29, 1976, discloses an apparatus for removal of sulfur oxides and dust from a gas stream, said apparatus having nozzles for injecting an atomized solution into the gas, which nozzles are located in such a way that a swirling motion is imparted to the injected solution with a view to improve contact between the gas and the solution. However, in said apparatus only single-fluid nozzles are employed and it would not be possible with these to obtain a sufficient adjustable whirling motion of drying gas and atomized particles for obtainment of the desired result when drying polyvinylchloride latex.

In a preferred embodiment of the invention where the drying tower comprises a plurality of two-fluid nozzles, the direction of said two-fluid nozzles is so adjusted that the angle formed between the centre lines of the nozzles, projected onto a plane at right angles to the longitudinal axis of the tower, and a line through the centre of the drying tower and the orifices of the nozzles, projected onto same plane, is different for the individual two-fluid nozzles or for groups of two-fluid nozzles. In this embodiment it is possible to control the rotation very precisely.

The possibility in the process according to the invention of achieving a continuously variable precise control of the rotation by adjusting a number of the nozzles, results in a high degree of flexibility for a given apparatus, so that it is possible to satisfy given specifications for the final product using starting materials of widely different kinds.

In practice particularly satisfactory results have been achieved with an embodiment in which some of the two-fluid nozzles are so adjusted that their centre lines form an angle with a line through the centre of the drying tower and the orifices of the nozzles projected onto a plane at right angles to the longitudinal axis of the tower, whereas other two-fluid nozzles are so directed that their centre lines coincide with said line.

In general it holds good that an increase of the rotary motion within the drying tower, for example caused by further turning of some of the two-fluid nozzles, counteracts the influence exerted by an increased drying air inlet temperature on the quality of the resulting product. This means that turning of some of the nozzles provides the possibility of enhancing the drying air inlet temperature to achieve an economic advantage, without the product becoming difficult to grind, i.e. without the screen residue being increased subsequent to grinding.

It should be noted that also in the conventional spray drying procedure using rotary atomizer wheels there is a rotary motion about the centre line of the drying chamber. However, no effect similar to that achieved through the process according to the invention has been noted, and there has been no suggestion of providing rotary motion within nozzle towers of the type with which the invention is concerned.

Further, it should be noted that neither does nozzle atomization in a rotary air flow as illustrated in K. Masters, "Spray Drying", p. 245 (1972), i.e. a process where the rotation is provided by the total amount of drying air being tangentially injected, yield the same good results as the process according to the invention. Adequate control of the rotation is not possible. This rotation should not be too vigorous since otherwise the heat treatment of the particles will be insufficient.

The flexibility of the process when using continuous variable control with individual nozzle levers or groups of nozzle levers makes it possible, over a wide range of drying air temperature and other process conditions, to achieve a product which on the one hand is suitably grindable and on the other hand provides a plastisol of a satisfactorily low viscosity.

As mentioned above said rotary motion is most expediently obtained by turning the nozzle levers since the high velocity and great volume of air through the nozzles provide the possibility of a very effective control of the rotary motion within the tower.

While performing the process, particularly in such cases where the rotary motion is provided by the disposition of two-fluid nozzles, it has been found that the tendency towards material deposits in the drying tower at the vicinity of the drying air inlet is substantially lower than in the prior art process where there is no rotation. This is a significant advantage since such material deposits will be damaged by the high temperature prevailing in the relevant part of the drying tower and lead to deterioration of the product. The reason why the tendency towards material deposits is lower, is assumed to be that under the flow conditions prevailing during the performance of the process according to the invention the temprature at the part of the drying tower near the drying air inlet will be substantially lower than is the case in a similar drying process without rotation.

Further, this invention relates to a drying tower for performing the process, said drying tower comprising a tower with a cylindrical portion, members for providing a flow of drying air through the tower in the direction of the longitudinal axis thereof, and two-fluid nozzles for atomizing liquid into the tower by means of pressurised air. According to the invention this drying tower is characterised in that it comprises at least one injector member for injecting air in a direction which, projected onto a plane at right angles to the longitudinal axis of the tower, forms an angle with a line through the centre of the tower and the outlet orifice of the injector member.

A preferred embodiment, see above, is characterised in that each injector member consists of one of said two-fluid nozzles which is so directed that its centre line, projected onto a plane at right angles to the longitudinal axis of the tower, forms an angle with a line through the centre of the tower and the nozzle outlet orifice, or which is arranged for being so turned that the centre line forms an angle with said line.

Figure 6:
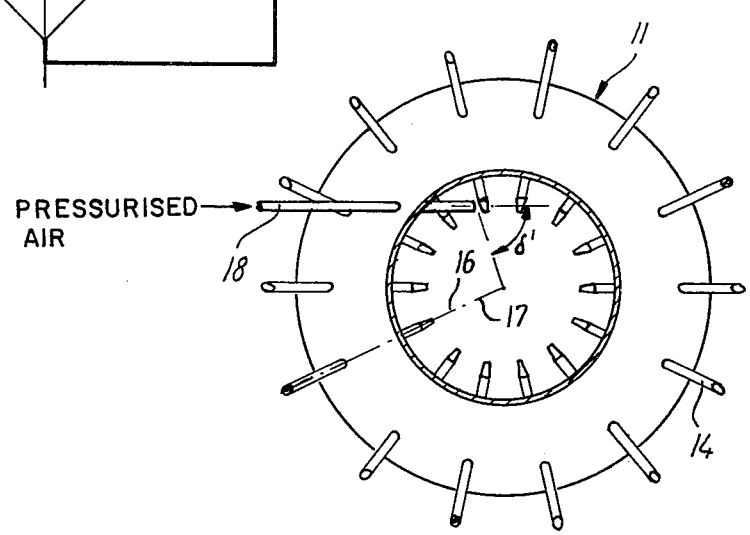

The process according to the invention will be further explained with reference to the drawings, where FIG. 1 very diagrammatically and partly in section shows an embodiment of a drying tower according to the invention, said section being taken on line I—I in FIG. 2, FIG. 2 shows diagrammatically a section of the drying tower shown in FIG. 1, taken on line II—II, FIG. 3 shows a single nozzle lever, FIG. 4 shows diagrammatically the upper portion of the drying tower, shown in FIG. 1, viewed on the slant from below, and displaying only one nozzle lever viewed from the rear so that the angle between the two-fluid nozzle and the vertical centre line, also called the longitudinal axis, of the drying tower is set off, FIG. 5 shows diagrammatically and partly in section another embodiment of a drying tower according to the invention, and FIG. 6 shows diagrammatically a sectional view of the drying tower shown in FIG. 5, taken on line VI—VI.

Figure 7:
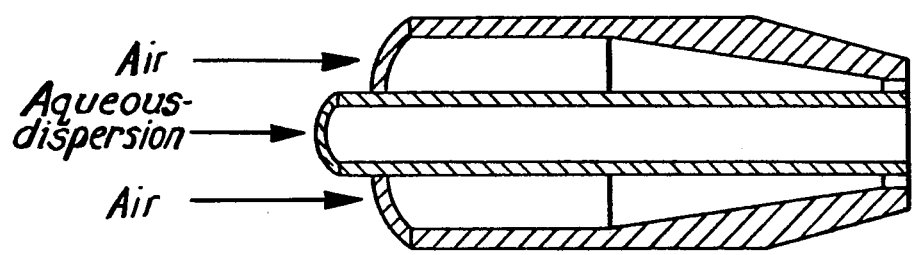

FIG. 7 illustrates a cross-sectional view of a typical two-fluid nozzle for use in the present invention.

In FIGS. 1, 2 and 4, 1 is the drying tower as such. In the upper portion thereof hot drying air is supplied through pipe 2 and penetrates through one or more distributor plates 3 down into the drying chamber of drying tower 1.

Nozzle levers 4 and 5 are introduced into the upper portion of the drying tower. In the embodiment shown, as will appear from FIGS. 1 and 2, these nozzle levers belong to two groups (a and b), of which the nozzle levers of group a are so set that centre line 6 of each nozzle, projected onto a plane at right angles to the longitudinal axis of the tower, forms an angle with line 7 through the centre of the drying tower and the outlet orifice of the nozzle, thereby providing a rotary motion within said drying tower.

The nozzle levers of the outer group b are, in the embodiment shown, directed horizontally towards the longitudinal axis or centre line of the tower. These last-mentioned nozzles do not contribute to the rotary or helical motion within the drying tower.

The outside ends of the nozzle levers connect individually to sources (not shown) of pressuresed air and latex. The two-fluid nozzles as such are of conventional design, for example as shown in K. Masters, "Spray Drying", p. 196–228 (1972).

The volume of air injected via the two-fluid nozzles is normally only very small as compared with the volume of air supplied via pipe 2, for example approximately 10% thereof. The air injected through the two-fluid nozzles need not be heated to the same temperature as the last-mentioned drying air, but nevertheless it is expedient that it has such temperature when injected as to cause no formation of condensation.

As mentioned above, the drawing shows two groups of uniformly set nozzle levers, and with such an arrangement excellent results have been achieved, but it is also possible to perform the process according to the invention with all the levers set uniformly. In another arrangement there may be a further differentiated setting thereof so that the drying tower operates with three or more groups of nozzle levers, the setting of which may vary both as far as angle $\beta$ (or $\beta'$) and angle $\gamma$ (FIG. 4) are concerned.

The major part of the powder produced by the process is discharged from the rying tower together with the drying gas through pipe 8, whereas the remainder is discharged from the bottom of the drying tower through pipe 9. The mixture of drying gas and powder from pipe 8 is expediently directed to a cyclone or filtering unit, not shown, together with powder form pipe 9, where the product is separated from the gas.

Angles $\alpha$, $\beta$, $\beta'$, and $\gamma$, as well as dimensions L and H indicated in FIGS. 1, 3 and 4 find application in the examples given below in defining the equipment used.

As will appear clearly from FIG. 3, the centre line of the nozzle tip forms, in the embodiment illustrated, an angle $\alpha$ with the nozzle lever, which affords the special advantage that angle $\gamma$, and consequently also angle $\delta$, can be changed only by turning the nozzle lever on its longitudinal axis as illustrated in FIG. 4. For the purpose of clearness this latter figure shows only a single nozzle lever belonging to group a. The desired setting of a nozzle tip can, however, also be obtained even if the nozzle tip forms no angle with the axis of the nozzle lever.

In FIGS. 5 and 6 references 11, 12 and 13 are elements similar to those referred to in FIGS. 1 and 2 as 1, 2 and 3, respectively.

This embodiment comprises a plurality of two-fluid nozzles, the nozzle tips of which are straight extensions of the nozzle levers, and centre lines 16 of which, when projected onto a plane at right angles to longitudinal axis 15 of the drying tower, coincide with line 17 through the centre of the tower and the nozzle outlet orifices. Thus, the two-fluid nozzles do not contribute to any rotary motion.

Installed above nozzle level there is a horizontal pipe 18, the centre line of which forms an angle δ' with a line from the pipe outlet opening at a right angle to the longitudinal axis of the tower. Consequently, when injecting air through pipe 18 it is possible to achieve the desired rotation.

The process according to the invention will be further explained by means of examples and comparisons given below.

EXAMPLE 1

Polyvinylchloride latex containing 33% by weight (±2 percent by weight) of solid matter was dried in an industrial drying tower as shown in FIGS. 1, 2 and 5, having a diameter of 9.9 m. The tower was provided with a perforated ceiling air distributor and 80 two-fluid nozzles. The pressurised air thereto supplied had a pressure of 2.9 ato, and the weight ratio of pressurised air to latex was 1.3. The nozzle lever angle $\alpha$ was 30° C., and height H (see FIG. 1) was 3.9 m. The nozzles were evenly distributed around the circumference and were all located at a distance from the centre line L=3.2 m. Every second nozzle lever (corresponding to group b described above) had an angle of inclination with respect to the horizontal plane $\beta=30°$, whereas $\gamma$ (see FIG. 4) was 180°, and every second nozzle lever, corresponding to group a described above, had $\beta'=10°$, and angle $\gamma$ was for this group first set to 18°, then to 22° and finally to 30°.

The drying air inlet and outlet temperatures were constantly maintained at 180° C. and 65° C., respectively.

The products obtained with these three different settings were ground in an "Alpine" laboratory mill, whereafter the ground sample was screened and the screen residue, i.e. particles larger than 63μ, was determined. The screened material was processed into a plastisol by means of disctylterephthalate, so that the polymer content of the plastisol was 70% by weight. After 24 hours rest at 24° C. the viscosity of the plastisol was determined by means of a "Haake" viscosimeter having a shearing gradient of 411 sec.$^{-1}$.

The following results were achieved:
Setting of angle $\gamma=18°$: screen residue 1.8%, "Haake" viscosity 8.0 Pa.s.
Setting of angle $\gamma=22°$: screen residue 1.2%, "Haake" viscosity 9.9 Pa.s.
Setting of angle $\gamma=30°$: screen residue 0.8%, "Haake" viscosity 11.5 Pa.s.

These values are significantly better than those obtainable with this drying air inlet temperature in the prior art processes, see comparison examples below.

EXAMPLE 2

Polyvinylchloride latex of the same type as used in Example 1 was dried using an equipment like that described in Example 1 with the modification that the angle $\alpha$ of the nozzle levers was 75°, and dimnsion H was 0.9 m.

The nozzle levers were so adjusted that all nozzle levers had $\beta=15°$ and $\gamma=40°$.

Experiments were made both with a drying air inlet temperature of 155° C. and this temperature set at 180°, whereas the outlet temperature was maintained constantly at 65° C.

Having ground the product and produced plastisol in the manner described in Example 1, the following results were obtained.
Inlet temperature 155° C., "Haake" viscosity 15 Pa.s, screen residue 0.6%.
Inlet temperature 180° C., "Haake" viscosity 10 Pa.s, screen residue 1.6%.

The results here obtained must also be considered particularly satisfactory.

EXAMPLE 3

The initial material and the equipment used was of the same type as described in Example 1. The diameter of the drying tower was 9.9 m. The tower had 80 two-fluid nozzles, and the pressurised air had a pressure of 2.9 ato, whereas the weight ratio of pressurised air to latex was 1.3. The nozzle levers had an angle $\alpha$ of 75°, and they were evenly distributed around the circumference of the tower at a distance of H=0.9 m from the perforated air distributor.

The nozzle levers were set so that 27 equally distributed nozzle levers were set at $\beta=15°$ and L=1.4 m, and 53 nozzle levers were set at $\beta=25°$ and L=2.5 m. All nozzles were turned through angle $\gamma=40°$.

The drying air inlet temperature was set to 155°, 160° and 165° C., respectively, whereas the outlet temperature was constantly maintained at 65° C.

After processing and analysing as described in Example 1, the following results were achieved:
Inlet temperature 155° C: Viscosity=16 Pa.s, screen residue 1.0%.
Inlet temperature 160° C.: Viscosity=14 Pa.s, screen residue 1.4%.
Inlet temperature 165° C.: Viscosity=12 Pa.s, screen residue 2.0%.

From these results it appears that the nozzle settings used in this example do not provide quite as good results as those obtained with the settings used in Example 1, but nevertheless better results than those obtainable by applying prior art technology, see the comparison examples.

EXAMPLE 4

Polyvinylchloride latex was dried in a laboratory drying tower having a cylindrical diameter of 1.7 m and a height of the cylindrical part of 8 m. Atomization was effected through a single two-fluid nozzle centrally arranged and directed vertically downwards. The weight ratio of pressurised air to latex supplied to the two-fluid nozzle was 1.2. The pressure of the pressurised air was 3.0 ato. The tower was equipped with a perforated ceiling air distributor.

The drying air and the atomized latex were caused to rotate by using a principle similar to that shown in FIGS. 5 and 6, pressurised air being injected through two pipes, both of which were arranged in the same manner as pipe 18 in FIGS. 5 and 6.

Three experiments were made, viz. with a drying air inlet temperature of 180°, 220° and 260° C. In all three experiments the drying air outlet temperature was maintained at 65° C.

The resulting products had the following screen residues:
Inlet temperature 180° C.: Screen residue 0.45 percent by weight.

Inlet temperature 220° C.: Screen residue 0.62 percent by weight.

Inlet temperature 260° C.: Screen residue 0.32 percent by weight.

The viscosities of the plastisols produced on the basis of the three products were satisfactory in each case.

COMPARISON EXAMPLE 1

Polyvinylchloride latex of the same type as used in Example 1 was dried in a conventional spray drying installation comprising rotary atomizer wheels. The drying air inlet and outlet temperatures were 210° C. and 70° C., respectively.

The resulting product was analysed in the same manner as above described. Measured in a "Haake" viscosimeter as in Example 1, the plastisol had a viscosity of 26.4 Pa.s, and a screen residue of 0.1%. This high viscosity will have a restrictive effect on the applicability of the produce and will probably necessitate the use of solvents with a view to reducing the viscosity of the plastisol.

COMPARISON EXAMPLE 2

This comparison example was carried out with the same latex, temperature and equipment as used in Example 1, with the modification that the two-fluid nozzles were equally distributed over the cross section of the tower, and they were directed vertically downwards.

Under these conditions the viscosity of the plastisol was 7 Pa.s, and the screen residue was 6 percent by weight.

COMPARISON EXAMPLE 3

This example was carried out with the same latex, equipment and operational conditions as in Example 4, with the modification that no pressurised air was injected through the two pipes referred to in said example, for which reason the drying air and atomized latex were not caused to rotate.

The following results were achieved:

Inlet temperature 180° C.: Screen residue 1.5 percent by weight.

Inlet temperature 220°C.: Screen residue 2.4 percent by weight.

Inlet temperature 260° C.: Screen residue 4.0 percent by weight.

This shows values of screen residues which in all three cases are substantially higher than those of Example 4, where rotary motion of drying air and atomized latex about the longitudinal axis of the drying tower was used.

What we claim is:

1. A drying tower comprising a tower having a cylindrical part, means at one end thereof for providing a flow of drying air through the tower, at least one two-fluid nozzle for atomizing liquid into the tower by means of pressurised air in which the pressurised air is projected annularly with respect to the liquid, and at least one injector member for injecting air in a direction which, projected onto a plane at right angles to the longitudinal axis of the tower, forms an angle with a line through the centre of the tower and the outlet opening of the injector member, thereby providing within said drying tower a controlled rotary motion of the particles produced by the atomization and the flow of drying air.

2. A drying tower for use in performing the process as claimed in claim 1 comprising a tower having a cylindrical part, means at one end thereof for providing a flow of drying air through the tower, and at least one two-fluid nozzle for atomizing liquid into the tower by means of pressurised air, at least one such two-fluid nozzle being so directed that its centre line, projected onto a plane at right angles to the longitudinal axis of the towwr, forms an angle ($\delta$) with a line also projected onto said plane through the centre of the tower and the outlet orifice of the nozzle, or being arranged for being turned so that the centre line projected onto said plane forms an angle with said line (projected onto said plane).

3. A powder obtained as a result of the process in accordance with claim 1.

4. A process for the production of a powder of polyvinylchloride or a vinylchloride copolymerisate suitable for the production of plastisols comprising
   (a) atomizing an aqueous dispersion of polyvinylchloride or a vinylchloride copolymerisate into a substantially uniform flow of drying air within a drying tower, so that the drying is carried out substantially as a co-current process, said atomizing taking place via at least one two-fluid nozzle in which pressurised air is projected annularly with respect to said aqueous dispersion of polyvinylchloride or vinylchloride copolymerisate,
   (b) providing within said drying tower a controlled rotary motion of particles produced by the atomization and of the drying air about the longitudinal axis of said drying tower by injecting, via at least one injection member, pressurised air in a direction which, projected onto a plane at right angles to the longitudinal axis of the drying tower, forms an angle with a line through the centre of the drying tower and the injector outlet orifice, and
   (c) grinding at least the coarsest fraction of the resulting powder.

5. A process as claimed in claim 1, wherein the temperature of the drying air, when introduced into the drying tower, is above 140° C.

6. A process as claimed in claim 5, wherein the temperature of the drying air, when introduced into the drying tower, is between 180° and 280° C.

7. A process as claimed in claim 1, wherein at least one two-fluid nozzle is used as the injector member.

8. A process as claimed in claim 1, wherein a plurality of two-fluid nozzles are used and the direction of said two-fluid nozzles is so adjusted that the angle formed between the centre line of each nozzle and a line through the centre of the drying tower and the orifice of the nozzle, projected onto a plane at right angles to the longitudinal axis of the tower is different for the individual two-fluid nozzles or groups of two-fluid nozzles.

9. A process as claimed in claim 1, wherein a plurality of two-fluid nozzles are used and some of the two-fluid nozzles are so adjusted that their centre lines form an angle with a line through the centre of the drying tower and the orifice of the nozzles, projected onto a plane at right angles to the longitudinal axis of the tower, whereas other two-fluid nozzles are so directed that their projected centre lines coincide with said projected line.

* * * * *